(12) United States Patent
Ueno et al.

(10) Patent No.: US 9,284,897 B2
(45) Date of Patent: *Mar. 15, 2016

(54) INTAKE CONTROL SYSTEM FOR INTERNAL COMBUSTION ENGINE

(71) Applicant: HONDA MOTOR CO., LTD., Tokyo (JP)

(72) Inventors: Masaki Ueno, Wako (JP); Masaya Agata, Wako (JP); Hisashi Ito, Wako (JP); Hideharu Takamiya, Wako (JP); Kentaro Onuma, Wako (JP); Kohei Hanada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 297 days.

This patent is subject to a terminal disclaimer.

(21) Appl. No.: 13/964,367

(22) Filed: Aug. 12, 2013

(65) Prior Publication Data

US 2014/0060485 A1 Mar. 6, 2014

(30) Foreign Application Priority Data

Aug. 31, 2012 (JP) ................................. 2012-192281

(51) Int. Cl.
*F02D 41/00* (2006.01)
*F02P 5/152* (2006.01)
(Continued)

(52) U.S. Cl.
CPC .......... *F02D 41/0002* (2013.01); *F02D 11/105* (2013.01); *F02D 37/02* (2013.01);
(Continued)

(58) Field of Classification Search
CPC .... F02D 41/0002; F02D 11/105; F02D 41/14
USPC .......................... 123/344, 399, 436, 400, 402
See application file for complete search history.

(56) References Cited

U.S. PATENT DOCUMENTS

| | | | |
|---|---|---|---|
| 2002/0050269 A1* | 5/2002 | Osanai | 123/339.11 |
| 2008/0127938 A1* | 6/2008 | Hagari | 123/439 |
| 2010/0236521 A1 | 9/2010 | Shiomi et al. | |
| 2012/0053822 A1 | 3/2012 | Kosaka et al. | |
| 2014/0088851 A1* | 3/2014 | Ueno et al. | 701/103 |

FOREIGN PATENT DOCUMENTS

| | | |
|---|---|---|
| DE | 698 37 189 T2 | 6/2007 |
| EP | 0 924 420 B1 | 2/2007 |

(Continued)

OTHER PUBLICATIONS

German Search Report application No. DE 10 2013 217 195.1 dated Nov. 11, 2013.

*Primary Examiner* — Mahmoud Gimie
(74) *Attorney, Agent, or Firm* — Squire Patton Boggs (US) LLP

(57) ABSTRACT

An intake control system for an internal combustion engine, which, even when there are a plurality of intake air amounts for attaining one target torque, is capable of positively selecting a minimum intake air amount therefrom without causing hunting, and setting the minimum intake air amount as a target intake air amount, thereby making it possible to improve fuel economy. The intake control system calculates a maximum intake air amount, sets a plurality of provisional intake air amounts within a range of 0 to the maximum intake air amount, calculates torques estimated to be output from the engine with respect to the provisional intake air amounts, respectively, selects a minimum provisional intake air amount that makes the estimated torque equal to or close to the target torque from the relationship between the provisional intake air amounts and the estimated torques, and sets the same as the target intake air amount.

4 Claims, 12 Drawing Sheets

(51) Int. Cl.
*F02D 11/10* (2006.01)
*F02D 37/02* (2006.01)
*F02D 41/14* (2006.01)

(52) U.S. Cl.
CPC .......... *F02D41/1406* (2013.01); *F02P 5/152* (2013.01); *F02D 41/005* (2013.01); *F02D 41/14* (2013.01); *F02D 2041/001* (2013.01); *F02D 2041/0017* (2013.01); *F02D 2200/1002* (2013.01); *Y02T 10/42* (2013.01); *Y02T 10/46* (2013.01)

(56) References Cited

FOREIGN PATENT DOCUMENTS

| JP | 04298661 | A | * | 10/1992 | ............. F02D 41/14 |
| JP | 2007218132 | A | * | 8/2007 | |
| JP | 4832542 | B2 | | 9/2011 | |

* cited by examiner

F I G. 1
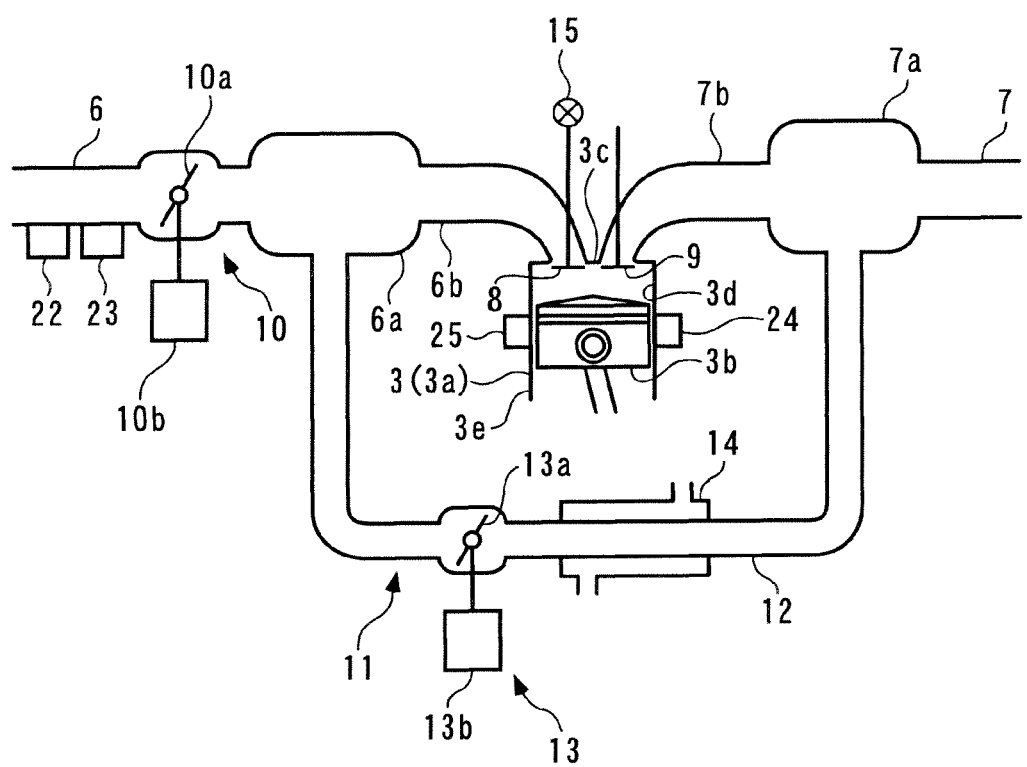

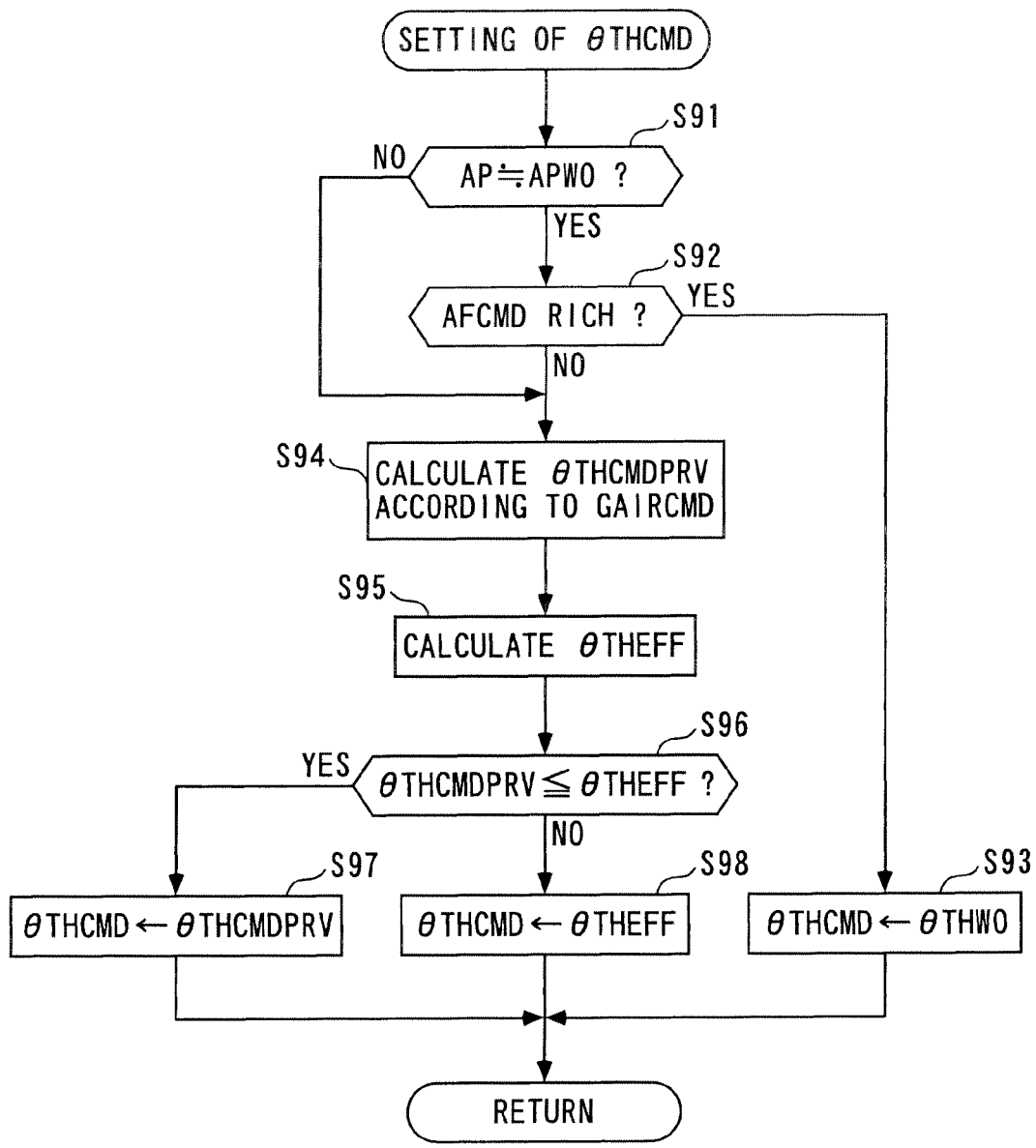

INTAKE CONTROL SYSTEM FOR INTERNAL COMBUSTION ENGINE

BACKGROUND OF THE INVENTION

1. Field of the Invention

The present invention relates to an intake control system for an internal combustion engine, which sets a target intake air amount according to a target torque, to thereby control an intake air amount.

2. Description of the Related Art

A conventional intake control system for an internal combustion engine is disclosed e.g. in Japanese Patent Publication No. 4832542. The intake control system sets a target intake air amount according to a target torque of the engine in the following manner: First, a provisional target intake air amount, which is a provisional value of the target intake air amount, is set to an initial value. Then, an estimated retard amount of ignition timing, which is estimated to be set assuming that the provisional target intake air amount of intake air is supplied to the engine, is calculated according to operating conditions of the engine at the time. Next, under these conditions of the provisional target intake air amount and the estimated retard amount, a torque estimated to be output from the engine is calculated as an estimated torque.

When the difference between the calculated estimated torque and the target torque is large, the provisional target intake air amount is corrected such that the estimated torque becomes close to the target torque. Specifically, when the estimated torque is larger than the target torque, the provisional target intake air amount is reduced, whereas when the opposite is the case, the provisional target intake air amount is increased. The estimated retard amount and the estimated torque are calculated again based on the corrected provisional target intake air amount. Such a process is repeatedly performed until the estimated torque converges to the target torque. When the estimated torque has converged to the target torque, the provisional target intake air amount at the time is set as the target intake air amount that attains the target torque. On the other hand, when the estimated torque does not converge to the target torque in spite of execution of the above-described process a predetermined number of times, the provisional target intake air amount at the time is set as the target intake air amount.

When the air-fuel ratio of a mixture burned in the engine is controlled to a fixed value, e.g. to a stoichiometric air-fuel ratio, normally, the torque of the engine has a characteristic that it increases as the intake air amount increases. The above-described conventional intake control system is preconditioned on such an output characteristic of torque. However, for example, in a case where the engine is a high compression ratio engine, and to suppress knocking, the retard amount of the ignition timing is set to a relatively large value, particularly when an engine coolant temperature is high or when an intake air temperature is high, the combustion efficiency of the engine is reduced by retarding of the ignition timing, so that even when the intake air amount is increased, the torque of the engine is not increased or even reduced. In this case, for one target torque, there are a plurality of solutions to the intake air amount for attaining the target torque.

However, the conventional intake control system employs a method of finding an intake air amount that attains a target torque, by using an initial value of a provisional target intake air amount to start with, and thereafter repeatedly performing correction of the provisional target intake air amount and checking of a state of convergence of an estimated torque based on the corrected provisional target intake air amount to the target torque. Therefore, there is a possibility of selecting a larger solution to the intake air amount from the above-mentioned plurality of solutions depending e.g. on a setting of the initial value of the provisional target intake air amount. In this case, according to selection of a larger intake air amount than required, an excessive amount of fuel which does not contribute to an increase in the torque is consumed, causing degradation of fuel economy. Further, for example, when the provisional target intake air amount is set to a larger value than the larger solution to the intake air amount, hunting of correction of the provisional target intake air amount is caused e.g. by correcting the provisional target intake air amount to a still larger value, which prevents the estimated torque from excellently converging to the target torque, and hence in this case as well, there is a fear that it is impossible to properly set the target intake air amount.

SUMMARY OF THE INVENTION

It is an object of the present invention to provide an intake control system for an internal combustion engine, which, even when there are a plurality of intake air amounts for attaining one target torque, is capable of positively selecting a minimum intake air amount therefrom without causing hunting, and setting the minimum intake air amount as a target intake air amount, thereby making it possible to improve fuel economy.

To attain the above object, the present invention provides an intake control system for an internal combustion engine, for setting a target intake air amount according to a target torque of the engine and controlling an intake air amount based on the set target intake air amount, comprising maximum intake air amount-calculating means for calculating, based on operating conditions of the engine, a maximum amount of intake air that can be drawn into a combustion chamber, as a maximum intake air amount, provisional intake air amount-setting means for setting a plurality of provisional intake air amounts different from each other within a range of the intake air amount, which ranges from 0 to the calculated maximum intake air amount, estimated torque-calculating means for calculating, based on the operating conditions of the engine, estimated torques that are estimated to be output from the engine assuming that the set plurality of provisional intake air amounts of intake air are drawn into the combustion chamber, respectively, as a plurality of estimated torques, provisional intake air amount-estimated torque relationship-setting means for setting a provisional intake air amount-estimated torque relationship, which is a relationship between the plurality of provisional intake air amounts and the plurality of calculated estimated torques, and target intake air amount-setting means for setting a minimum provisional intake air amount that makes the estimated torque equal to or close to the target torque, as the target intake air amount, by selecting the minimum provisional intake air amount from the set provisional intake air amount-estimated torque relationship.

With the configuration of this intake control system, the target intake air amount is set according to the target torque of the engine in the following manner: First, the maximum amount of intake air that can be drawn into the combustion chamber is calculated as the maximum intake air amount based on operating conditions of the engine, and a plurality of provisional intake air amounts are set within the range of 0 to the maximum intake air amount. Then, based the operating conditions of the engine at the time, a plurality of estimated torques that are estimated to be output from the engine assuming that the plurality of provisional intake air amounts of intake air are drawn into the combustion chamber, respectively, are calculated, and the provisional intake air amount-estimated torque relationship is set which is a relationship between the plurality of calculated provisional intake air amounts and the plurality of calculated estimated torques. Then, based on the set provisional intake air amount-estimated torque relationship, the minimum provisional intake air amount that makes the estimated torque equal to or close to the target torque is selected and set as the target intake air amount.

As described above, according to the present invention, the relationship between the provisional intake air amounts set within the range of 0 to the maximum intake air amount and the estimated torques that are estimated to be output from the engine when the respective provisional intake air amounts of intake air are drawn into the combustion chamber is set in advance as the provisional intake air amount-estimated torque relationship, and from the thus preset provisional intake air amount-estimated torque relationship, the minimum provisional intake air amount that makes the estimated torque equal to or close to the target torque is selected and set as the target intake air amount. Therefore, even when there are a plurality of solutions to the intake air amount for attaining one target torque, it is possible to positively select a minimum intake air amount from the solutions without causing hunting. Then, by setting the selected minimum intake air amount as the target intake air amount, it is possible to improve fuel economy.

Preferably, the target intake air amount-setting means sequentially searches the plurality of provisional intake air amounts in an increasing order of the provisional intake air amounts based on the provisional intake air amount-estimated torque relationship, for the provisional intake air amount that makes the estimated torque equal to or close to the target torque, and terminates the search of the provisional intake air amounts when the provisional intake air amount that makes the estimated torque equal to or close to the target torque is found, while setting the found provisional intake air amount as the target intake air amount.

With the configuration of the preferred embodiment, the plurality of provisional intake air amounts are sequentially searched in an increasing order of the provisional intake air amounts, for the provisional intake air amount that makes the estimated torque equal to or close to the target torque, and when the provisional intake air amount is found, the found provisional intake air amount is set as the target intake air amount. Therefore, it is possible to positively select the minimum intake air amount that attains one target torque. Further, when the provisional intake air amount is found, the search of the provisional intake air amounts is terminated, and no further search of the provisional intake air amounts is executed, and hence it is possible to reduce computational load.

Preferably, the intake control system further comprises provisional target throttle valve opening-calculating means for calculating a provisional target throttle valve opening, which is a provisional target of an opening degree of a throttle valve for adjusting the intake air amount, according to the target intake air amount, and target throttle valve opening-setting means for setting a target throttle valve opening, which is a final target value of the opening degree of the throttle valve, to the provisional target throttle valve opening when the calculated provisional target throttle valve opening is equal to or smaller than an effective valve opening, which is an opening degree of the throttle valve beyond which torque of the engine almost ceases to increase, and setting the target throttle valve opening, when the provisional target throttle valve opening is larger than the effective valve opening, by limiting the target throttle valve opening to the effective valve opening.

When the throttle valve has the effective valve opening described above, as a characteristic thereof, the torque of the engine almost ceases to increase even when the opening degree of the throttle valve becomes larger than the effective valve opening. Therefore, if the opening degree of the throttle valve is controlled according to the target torque in a range beyond the effective valve opening, this makes hunting liable to occur in which a controlled variable of (amount of change in) the opening degree of the throttle valve becomes very large with respect to the target torque, and the service lives of the throttle valve and an actuator thereof are shortened by such hunting. With the configuration of the preferred embodiment, when the provisional target throttle valve opening calculated according to the target intake air amount exceeds the effective valve opening, the target throttle valve opening is limited and set to the effective valve opening, so that it is possible to prevent hunting of the opening degree of the throttle valve from being caused in the range beyond the effective valve opening, to thereby prolong the service lives of the throttle valve and the actuator thereof.

The above and other objects, features, and advantages of the present invention will become more apparent from the following detailed description taken in conjunction with the accompanying drawings.

BRIEF DESCRIPTION OF THE DRAWINGS

FIG. 1 is a schematic view of an internal combustion engine to which the present invention is applied;

FIG. 16 is a flowchart of a process for setting a target throttle valve opening.

DETAILED DESCRIPTION OF PREFERRED EMBODIMENTS

Figure 2:
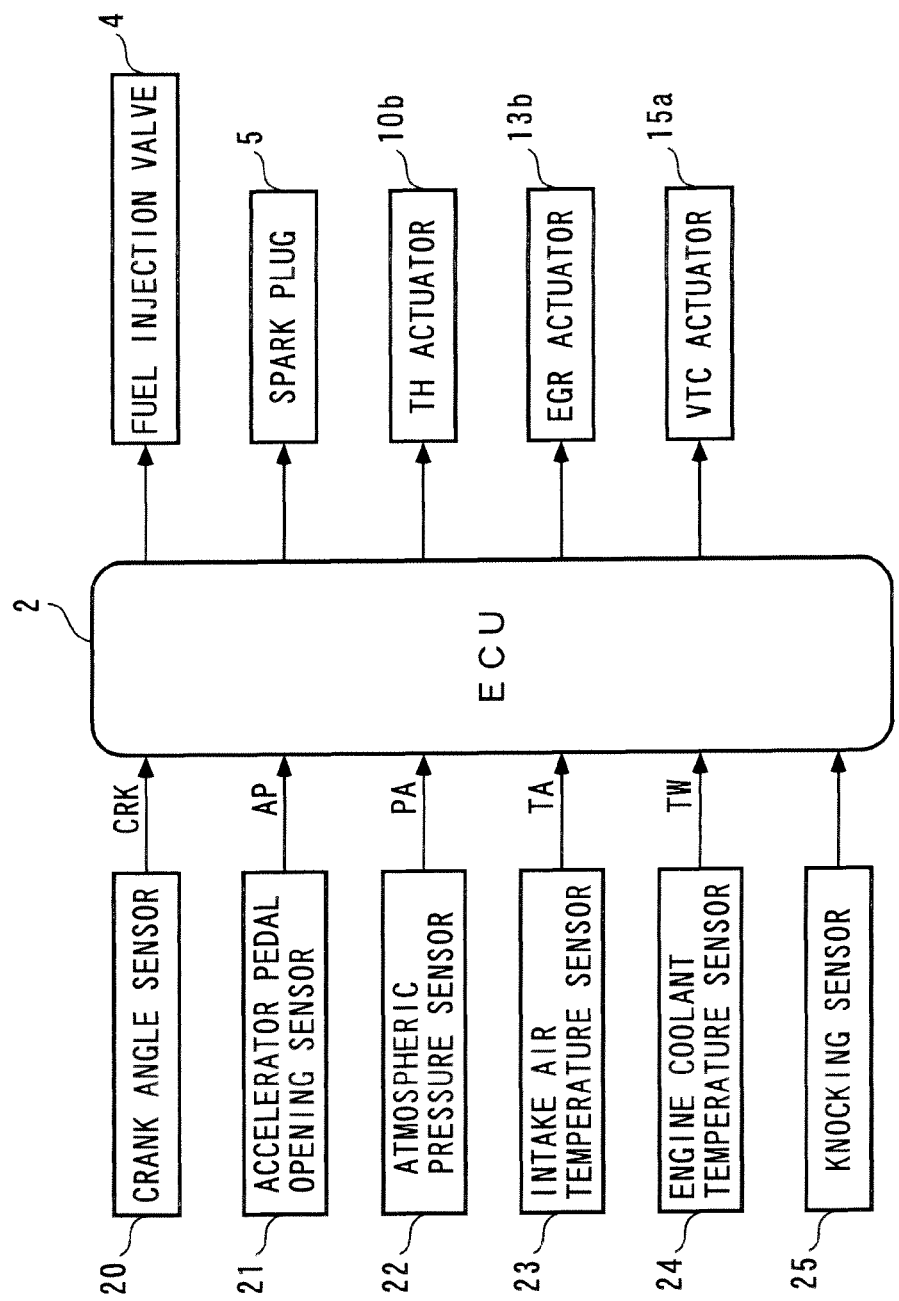
FIG. 2 is a block diagram of an intake control system.

The invention will now be described in detail with reference to drawings showing a preferred embodiment thereof. FIG. 1 shows an internal combustion engine (hereinafter referred to as the "engine") 3 to which the present invention is applied. The engine 3 is a gasoline engine that has e.g. four cylinders, and is installed on a vehicle, not shown. A combustion chamber 3d is defined between a piston 3b and a cylinder head 3c for each of cylinders 3a (only one of which is shown) of the engine 3.

An intake passage 6 is connected to the cylinder 3a via an intake manifold 6b having an intake collector 6a, and an exhaust passage 7 is connected to the cylinder 3a via an exhaust manifold 7b having an exhaust collector 7a. The intake manifold 6b is provided with fuel injection valves 4 (see FIG. 2) and the cylinder head 3c is provided with spark plugs 5 (see FIG. 2), on a cylinder-by-cylinder basis. The injection amount and injection timing of fuel injected by each fuel injection valve 4, and ignition timing IG of each spark plug 5 are controlled by control signals from an ECU 2, referred to hereinafter.

Further, an intake valve 8 and an exhaust valve 9 are provided for each cylinder 3a. A variable intake cam phase mechanism 15 is provided at one end of an intake cam shaft (not shown) for actuating the intake valve 8. The variable intake cam phase mechanism 15 steplessly changes a phase CAIN of the intake cam shaft relative to the crankshaft (not shown) of the engine 3 (hereinafter referred to as the "intake cam phase CAIN"), whereby the opening and closing timing of the intake valve 8 is steplessly changed (shifted) with respect to the crankshaft. Note that the intake cam phase CAIN is controlled by actuating the control shaft (not shown) of the variable intake cam phase mechanism 15 by a VTC actuator 15a (see FIG. 2), and the operation of the VTC actuator 15a is controlled by a control signal from the ECU 2.

A throttle valve mechanism 10 is disposed in the intake passage 6 at a location upstream of the intake collector 6a. The throttle valve mechanism 10 includes a butterfly-type throttle valve 10a disposed in the intake passage 6, and a TH actuator 10b for actuating the throttle valve 10a. An opening degree θTH of the throttle valve 10a (hereinafter referred to as the "throttle valve opening θTH") is controlled by controlling electric current supplied to the TH actuator 10b by the ECU 2, whereby an intake air amount (fresh air amount) GAIR of intake air drawn into the combustion chamber 3d is adjusted. Note that under normal operating conditions of the engine 3, a target air-fuel ratio AFCMD of a mixture of fuel supplied to the combustion chamber 3d and air is set to a stoichiometric air-fuel ratio to perform stoichiometric combustion, while during acceleration operation of the engine 3, the target air-fuel ratio AFCMD is controlled to a richer value than the stoichiometric air-fuel ratio.

Further, the engine 3 is provided with an EGR device 11 for recirculating part of exhaust gases discharged from the combustion chamber 3d into the exhaust passage 7 to the intake passage 6, as EGR gases. The EGR device 11 comprises an EGR passage 12, an EGR valve mechanism 13 disposed in an intermediate portion of the EGR passage 12, and an EGR cooler 14. The EGR passage 12 is connected to the exhaust collector 7a in the exhaust passage 7 and the intake collector 6a in the intake passage 6.

The EGR valve mechanism 13 includes a poppet-type EGR valve 13a disposed in the EGR passage 12, and an EGR actuator 13b for actuating the EGR valve 13a. A lift amount LEGR of the EGR valve 13a (hereinafter referred to the "EGR valve opening LEGR") is controlled by controlling electric current supplied to the EGR actuator 13b by the ECU 2, whereby an EGR amount GEGR of EGR gases recirculated to the intake passage 6 is adjusted. The EGR cooler 14 is disposed upstream of the EGR valve 13a, and cools high-temperature EGR gases using engine coolant of the engine 3.

The crankshaft of the engine 3 is provided with a crank angle sensor 20 (see FIG. 2). The crank angle sensor 20 delivers a CRK signal, which is a pulse signal, to the ECU 2 along with rotation of the crankshaft, whenever the crankshaft rotates through a predetermined crank angle (e.g. 30)°. The ECU 2 calculates a rotational speed NE of the engine 3 (hereafter referred to as the "engine speed NE") based on the CRK signal. Also delivered to the ECU 2 is a detection signal indicative of an operation amount AP of an accelerator pedal (not shown) of the vehicle (hereinafter referred to as the "accelerator pedal opening AP") from an accelerator pedal opening sensor 21 (see FIG. 2).

An atmospheric pressure sensor 22 and an intake air temperature sensor 23 are provided in the intake passage 6 at respective locations upstream of the throttle valve 10a. The atmospheric pressure sensor 22 detects an atmospheric pressure PA and delivers a signal indicative of the detected atmospheric pressure PA to the ECU 2. The intake air temperature sensor 23 detects a temperature TA of intake air flowing through the intake passage 6 (hereinafter referred to as the "intake air temperature TA") and delivers a signal indicative of the detected intake air temperature TA to the ECU 2.

Further, a cylinder block 3e of the engine 3 is provided with an engine coolant temperature sensor 24 and a knocking sensor 25. The engine coolant temperature sensor 24 detects a temperature TW of engine coolant of the engine 3 (hereinafter referred to as the "engine coolant temperature TW"), and delivers a signal indicative of the detected engine coolant temperature TW to the ECU 2. The knocking sensor 25 detects a state of occurrence of knocking and delivers a signal indicative of the detected state of occurrence of knocking to the ECU 2.

The ECU 2 is implemented by a microcomputer comprising a CPU, a RAM, a ROM and an I/O interface (none of which are specifically shown). The ECU 2 determines the operating conditions of the engine 3 based on the detection signals from the above-described sensors 20 to 25, and executes, depending on the determined operating conditions of the engine 3, various kinds of engine control, such as control of a fuel injection amount and the ignition timing IG, and intake control for controlling the intake air amount GAIR and the EGR amount GEGR.

In the present embodiment, for the intake control, a target torque TRQCMD of the engine 3 is set according to the accelerator pedal opening AP and so forth, and a target intake air amount GAIRCMD and a target EGR amount GEGRCMD are set according to the target torque TRQCMD and so forth. Further, a target throttle valve opening θTHCMD and a target EGR valve opening LEGRCMD, which are target values of the throttle valve opening θTH and the EGR valve opening LEGR, respectively, are set based on the respective target intake air amount GAIRCMD and target EGR amount GEGRCMD. Further, by actuating the throttle valve 10a and the EGR valve 13a based on the target throttle valve opening θTHCMD and the target EGR valve opening LEGRCMD, the intake air amount GAIR and the EGR amount GEGR are controlled.

In the present embodiment, the ECU 2 corresponds to maximum intake air amount-calculating means, provisional intake air amount-setting means, estimated torque-calculating means, provisional intake air amount-estimated torque relationship-setting means, target intake air amount-setting means, provisional target throttle valve opening-calculating means, and target throttle valve opening-setting means.

Figure 3:
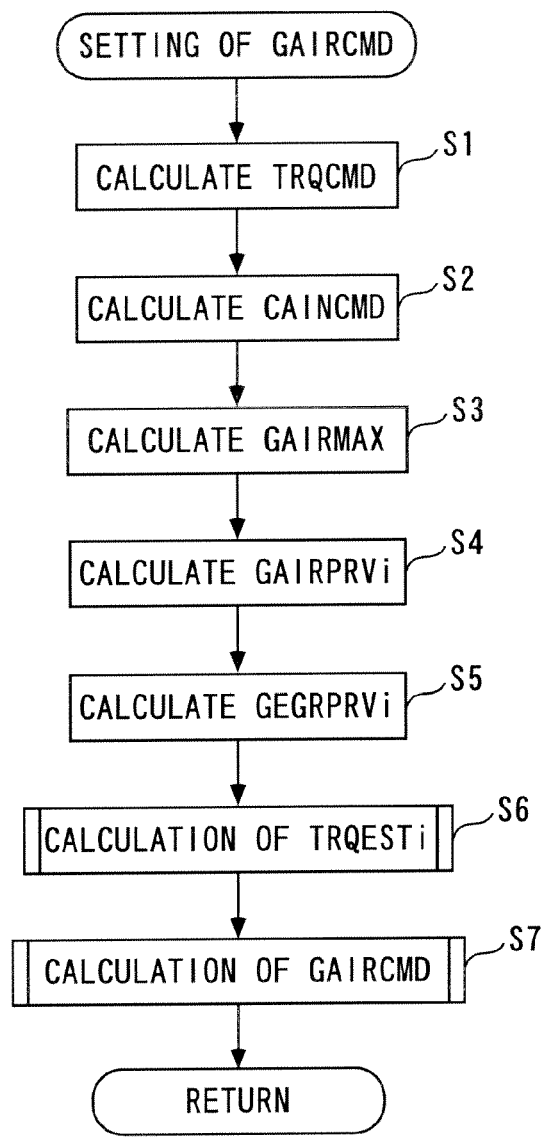
FIG. 3 is a flowchart of a main flow of a process for setting a target intake air amount.

FIG. 3 is a flowchart of a main flow of a process for setting a target intake air amount (GAIRCMD), executed by the ECU 2. This process is repeatedly executed whenever a predetermined time period elapses.

First, in a step 1 (shown as S1 in abbreviated form in FIG. 3; the following steps are also shown in abbreviated form), the target torque TRQCMD of the engine 3 is calculated by searching a predetermined TRQCMD map (not shown) according to the detected accelerator pedal opening AP and engine speed NE. In this TRQCMD map, the target torque TRQCMD is set such that it is substantially proportional to the accelerator pedal opening AP.

Next, a target intake cam phase CAINCMD is calculated by searching a predetermined CAINCMD map (not shown) according to the calculated target torque TRQCMD and the engine speed NE (step 2). In the CAINCMD map, as the target torque TRQCMD is larger, the target intake cam phase CAINCMD is set to be more advanced.

Then, a maximum intake air amount GAIRMAX is calculated by searching a predetermined GAIRMAX map (not shown) according to the calculated target intake cam phase CAINCMD and the engine speed NE (step 3). The maximum intake air amount GAIRMAX corresponds to the maximum amount of intake air which can be drawn into the combustion chamber 3d, under operating conditions of the engine 3 at the time.

Next, a plurality of provisional intake air amounts GAIRPRVi (i=1 to m) are calculated using the calculated maximum intake air amount GAIRMAX by the following equation (1) (step 4):

$$GAIRPRVi = (GAIRMAX/m) \times i \qquad (1)$$

As is apparent from the above equation (1), the provisional intake air amounts GAIRPRVi are formed by m intake air amounts corresponding respectively to 1 to m equal divisional amounts (one-mth amounts) of the maximum intake air amount GAIRMAX. The calculated provisional intake air amounts GAIRPRVi are stored in a predetermined storage area of the RAM of the ECU 2.

Next, each of a plurality of provisional EGR amounts GEGRPRVi is calculated by searching a predetermined GEGRPRV map (not shown) according to an associated one of the provisional intake air amounts GAIRPRVi, the target intake cam phase CAINCMD and the engine speed NE (step 5). In this GEGRPRV map, an EGR amount which makes it possible to obtain optimum fuel economy with respect to the provisional intake air amount GAIRPRV, the target intake cam phase CAINCMD, and the engine speed NE, is set as a provisional EGR amount GEGRPRV.

Note that when an intake pressure is limited so as to ensure the differential pressure between the upstream side and the downstream side of the EGR valve 13a e.g. for the reason that the vehicle is in highland conditions, the provisional EGR amounts GEGRPRVi are corrected such that they are reduced, as deemed appropriate. The calculated provisional EGR amounts GEGRPRVi are stored in the predetermined storage area of the RAM in a manner associated with the provisional intake air amounts GAIRPRVi.

Figure 4:
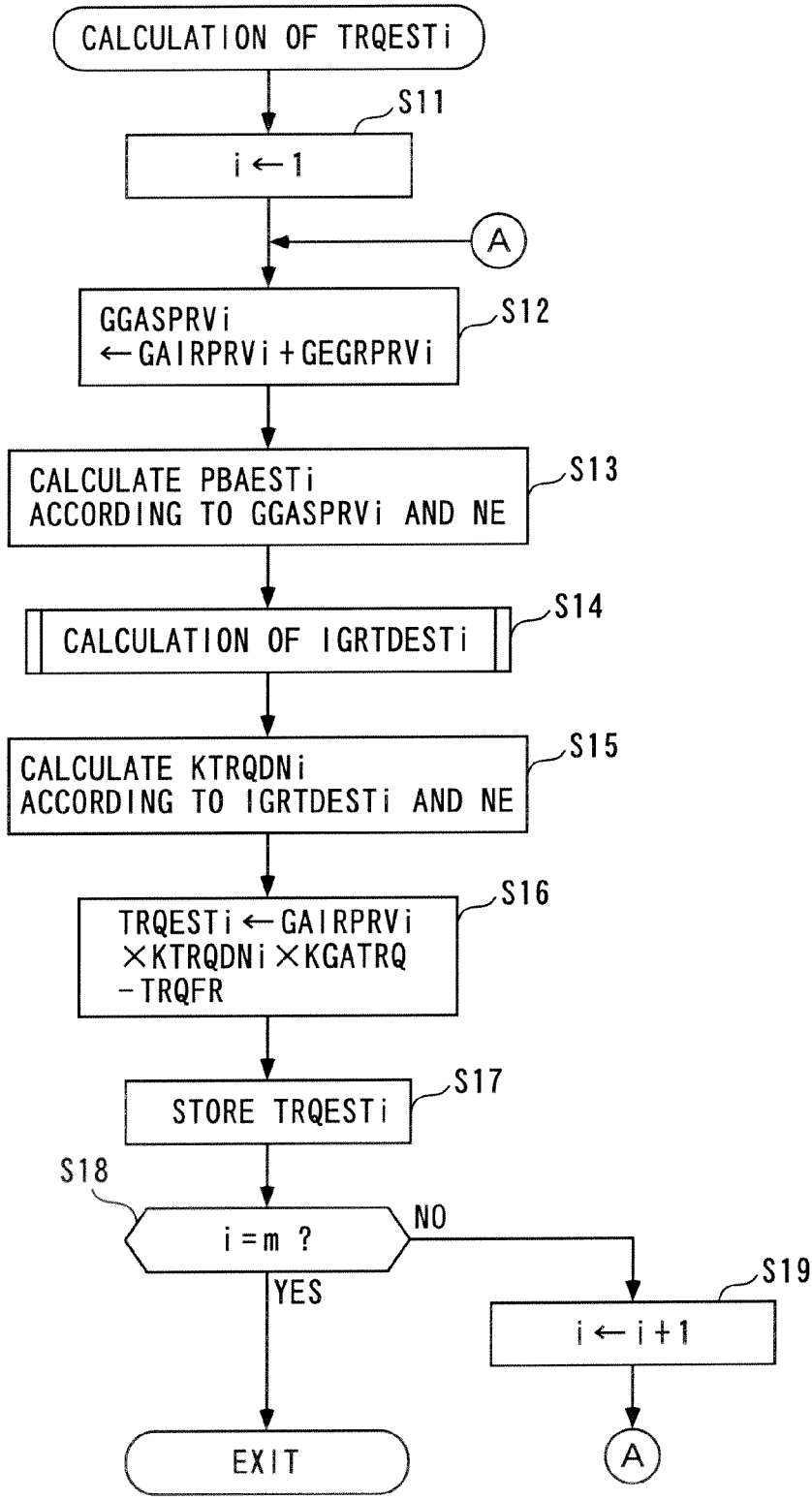
FIG. 4 is a flowchart of a subroutine of a process for calculating estimated torques.

Then, a plurality of estimated torques TRQESTi associated respectively with the provisional intake air amounts GAIRPRVi are calculated (step 6). The estimated torques TRQESTi are torques which are estimated to be output from the engine 3 assuming that the respective provisional intake air amounts GAIRPRVi of intake air are drawn into the combustion chamber 3d under the operating conditions of the engine 3 at the time. The estimated torques TRQESTi are each calculated on a provisional intake air amount basis. FIG. 4 shows a subroutine of the process for calculating the estimated torques TRQESTi.

In the present process, first, in a step 11, an index number i for indicating each of the provisional intake air amounts GAIRPRVi is set to 1. Then, the sum of the provisional intake air amount GAIRPRVi and the provisional EGR amount GEGRPRVi, calculated in the steps 4 and 5 in FIG. 3, respectively, is calculated as a provisional total gas amount GGASPRVi (step 12).

Figure 6:
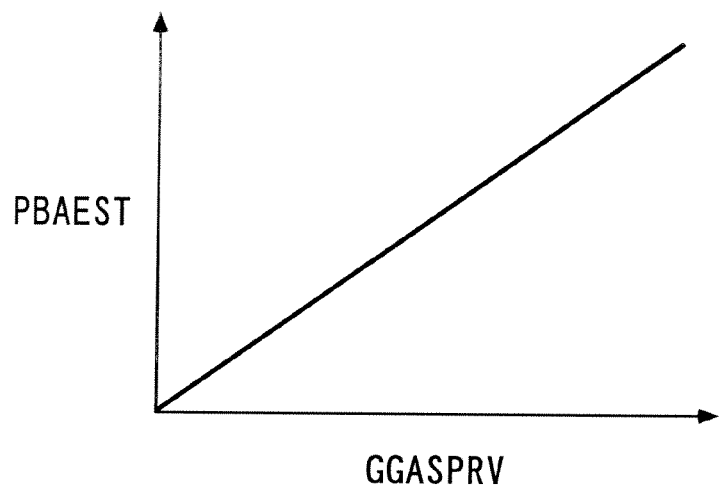
FIG. 6 is a map for calculating an estimated intake pressure, which is used in the process in FIG. 4.

Then, an estimated intake pressure PBAESTi is calculated by searching a PBAEST map shown in FIG. 6 according to the calculated provisional total gas amount GGASPRVi and the engine speed NE (step 13). The PBAEST map shown in FIG. 6 shows the relationship between the provisional total gas amount GGASPRV and the estimated intake pressure PBAEST for a predetermined engine speed NE, and the estimated intake pressure PBAEST is set such that it is proportional to the provisional total gas amount GGASPRV.

Figure 5:
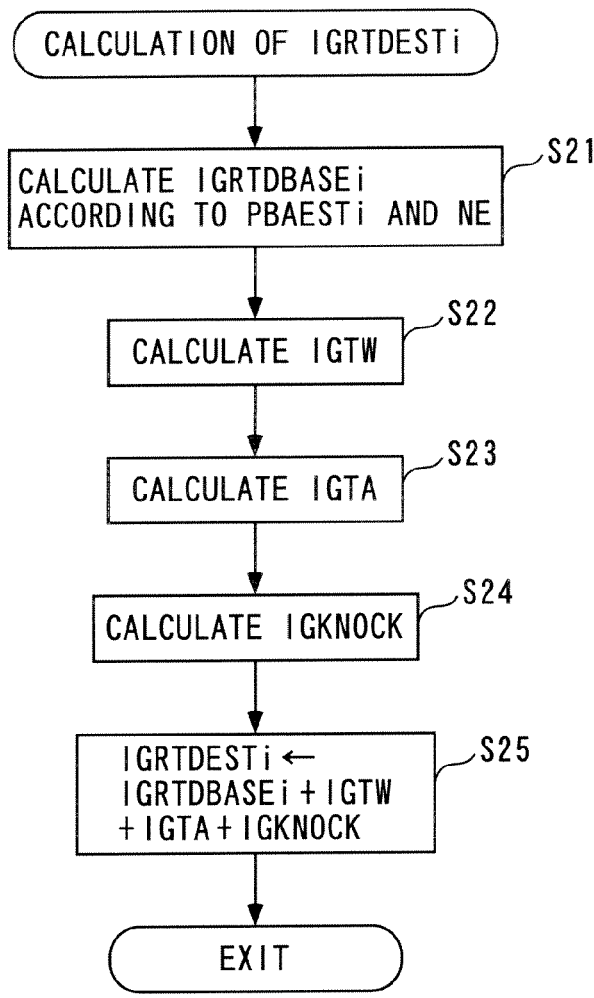
FIG. 5 is a flowchart of a subroutine of a subroutine of a process for calculating estimated retard amounts.

Next, an estimated retard amount IGRTDESTi is calculated based on the MBT (Minimum Spark Advance for Best Torque) of the ignition timing IG (step 14). FIG. 5 shows a subroutine of the process for calculating the estimated retard amount IGRTDESTi. In the present process, first, in a step 21, a basic value IGRTDBASEi of the estimated retard amount IGRTDESTi is calculated by searching a predetermined IGRTDBASE map (not shown) according to the estimated intake pressure PBAESTi in the above-described step 13 and the engine speed NE. As the estimated intake pressure PBAEST is higher, knocking is more liable to occur, and hence in this IGRTDBASE map, the basic value IGRTDBASE is set to a larger value, i.e. set to be more retarded.

Then, a coolant temperature-dependent correction amount IGTW of the ignition timing IG is calculated according to a detected engine coolant temperature TW (step 22), and an intake air temperature-dependent correction amount IGTA of the ignition timing IG is calculated according to a detected intake air temperature TA (step 23). Further, a knock-dependent correction amount IGKNOCK of the ignition timing IG is calculated according to a state of occurrence of knocking detected by the knocking sensor 25 (step 24). Then, an estimated retard amount IGRTDESTi of the ignition timing IG is calculated by adding the above-described three correction amounts IGTW, IGTA and IGKNOCK to the basic value IGRTDBASEi of the estimated retard amount calculated in the step 21 (step 25), followed by terminating the present process.

Figure 7:
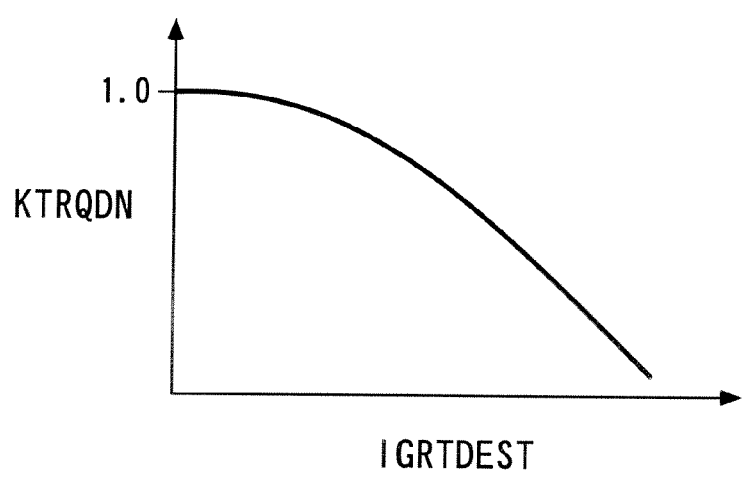
FIG. 7 is a map for calculating an estimated torque-down ratio, which is used in the process in FIG. 4.

Referring again to FIG. 4, in a step 15 following the step 14, an estimated torque-down ratio KTRQDNi with reference to torque during MBT combustion is calculated by searching a KTRQDN map shown in FIG. 7 according to the calculated estimated retard amount IGRTDESTi and the engine speed NE. The KTRQDN map shown in FIG. 7 shows the relationship between the estimated retard amount IGRTDEST and the estimated torque-down ratio KTRQDN at a predetermined engine speed NE, and as the estimated retard amount IGRTDEST is larger, the combustion efficiency of the engine 3 is reduced to lower an output torque, and hence the estimated torque-down ratio KTRQDN is set to a smaller value.

Then, the estimated torque TRQESTi is calculated using the provisional intake air amount GAIRPRVi, the above-described estimated torque-down ratio KTRQDNi, and so forth, by the following equation (2) (step 16):

$$TRQESTi = GAIRPRVi \times KTRQDNi \times KGATRQ - TRQFR \qquad (2)$$

In the equation, KGATRQ on the right side represents a predetermined conversion coefficient for converting the intake air amount GAIR to the output torque of the engine 3 during the stoichiometric and MBT combustion, and TRQFR on the right side represents a predetermined friction as a torque loss of the engine 3.

Next, the calculated estimated torque TRQESTi is stored in the storage area of the RAM in a manner associated with the provisional intake air amount GAIRPRVi (step 17). Further, it is determined whether or not an index number at this time is equal to the number m of samples of the provisional intake air amount GAIRPRVi (step 18). If the answer to this question is negative (NO), the index number is incremented in a step 19, and then the process returns to the above-described step 12, to is repeatedly execute the steps 12 to 17 for calculation of the estimated torque TRQESTi. When the calculation of the estimated torques TRQESTi in association with all the provisional intake air amounts GAIRPRVi is completed, the answer to the question of the step 18 becomes affirmative (YES), and accordingly, the present process is terminated.

By performing the above-described calculation process, the respective estimated torques TRQESTi which reflect the estimated retard amounts IGRTDESTi estimated according to the operating conditions of the engine 3 at the time are calculated with respect to all the provisional intake air amounts GAIRPRVi, and are stored in a manner associated with the provisional intake air amounts GAIRPRVi. This sets the relationship between the provisional intake air amounts GAIRPRVi and the estimated torques TRQESTi (hereinafter referred to as the "provisional intake air amount-estimated torque relationship), defined by a combination of m provisional intake air amounts GAIRPRV and m estimated torques TRQEST.

Figure 8:
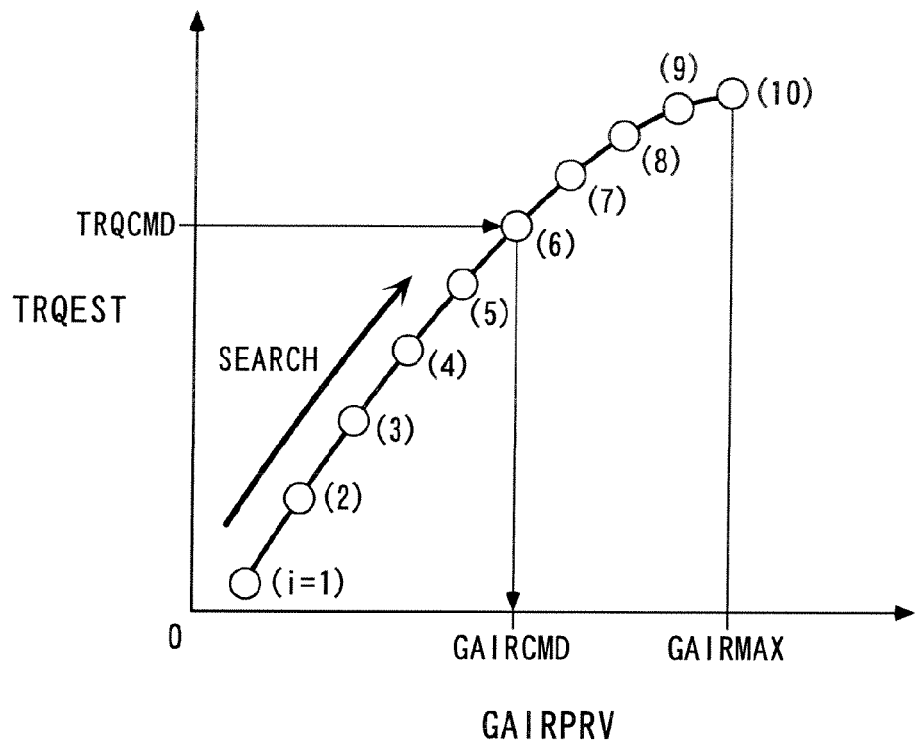
FIG. 8 is a view showing an example of an estimated torque characteristic curve having a characteristic of a first pattern.

FIGS. 8 to 11 show estimated torque characteristic curves obtained by plotting the provisional intake air amount-estimated torque relationship set as described above, and show four characteristic patterns different from each other. A first pattern shown in FIG. 8 is a normal pattern (monotonically increasing pattern) in which the estimated torque TRQEST monotonically increases as the provisional intake air amount GAIRPRV increases.

Figure 9:
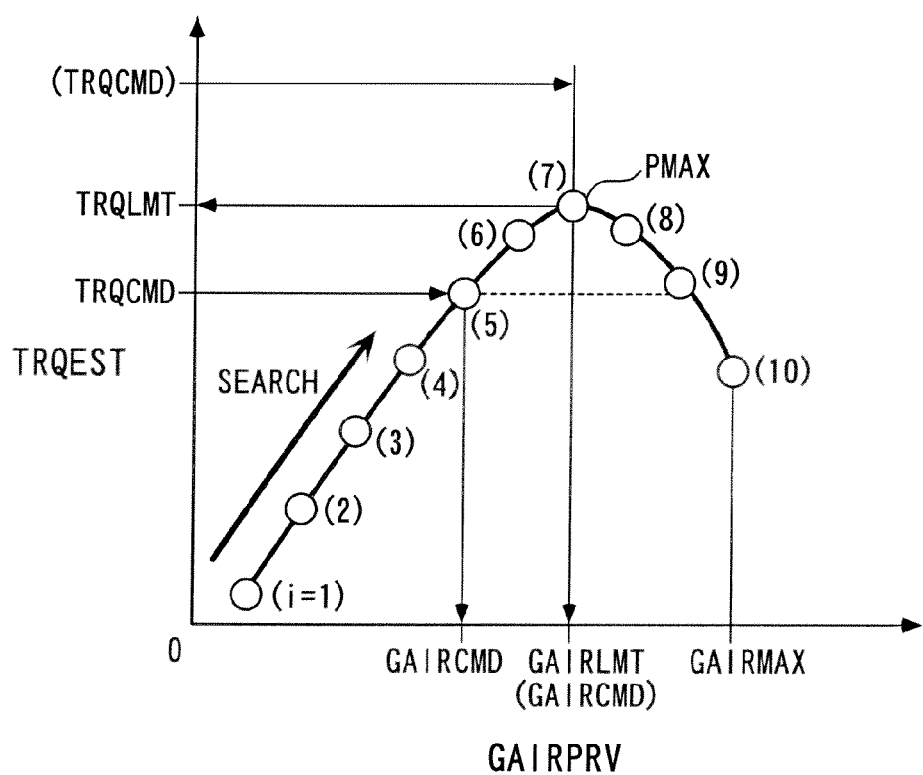
FIG. 9 is a view showing an example of an estimated torque characteristic curve having a characteristic of a second pattern.

A second pattern shown in FIG. 9 is a pattern (quadratic curve pattern) in which as the provisional intake air amount GAIRPRV increases, the estimated torque TRQEST increases to a maximum value, and after passing this maximum point PMAX, the estimated torque TRQEST decreases (drops) e.g. due to an increase in the estimated retard amount IGRTDEST for control of knocking.

Figure 10:
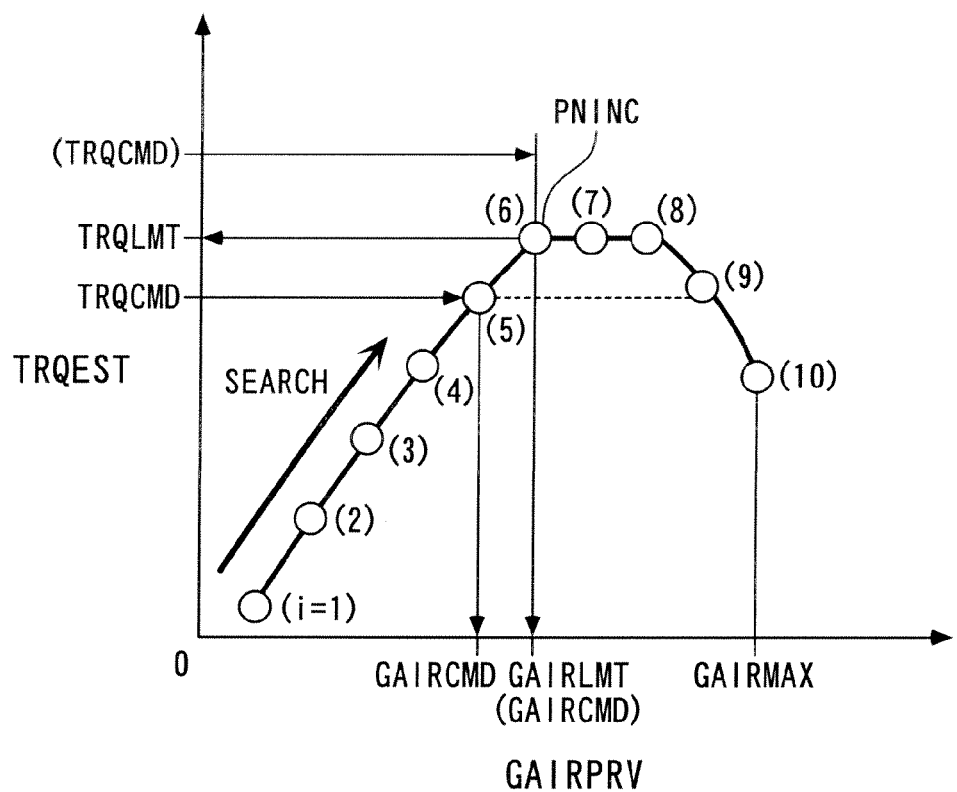
FIG. 10 is a view showing an example of an estimated torque characteristic curve having a characteristic of a third pattern.

A third pattern shown in FIG. 10 is a pattern which can be regarded as a variation of the second pattern and in which a specific maximum point of the estimated torque TRQEST does not appear as in the second pattern, but as the provisional intake air amount GAIRPRV increases, the estimated torque TRQEST increases up to a non-increasing point PNINC, and thereafter, even when the provisional intake air amount GAIRPRV increases, the estimated torque TRQEST is substantially constant instead of increasing, and then decreases.

Figure 11:
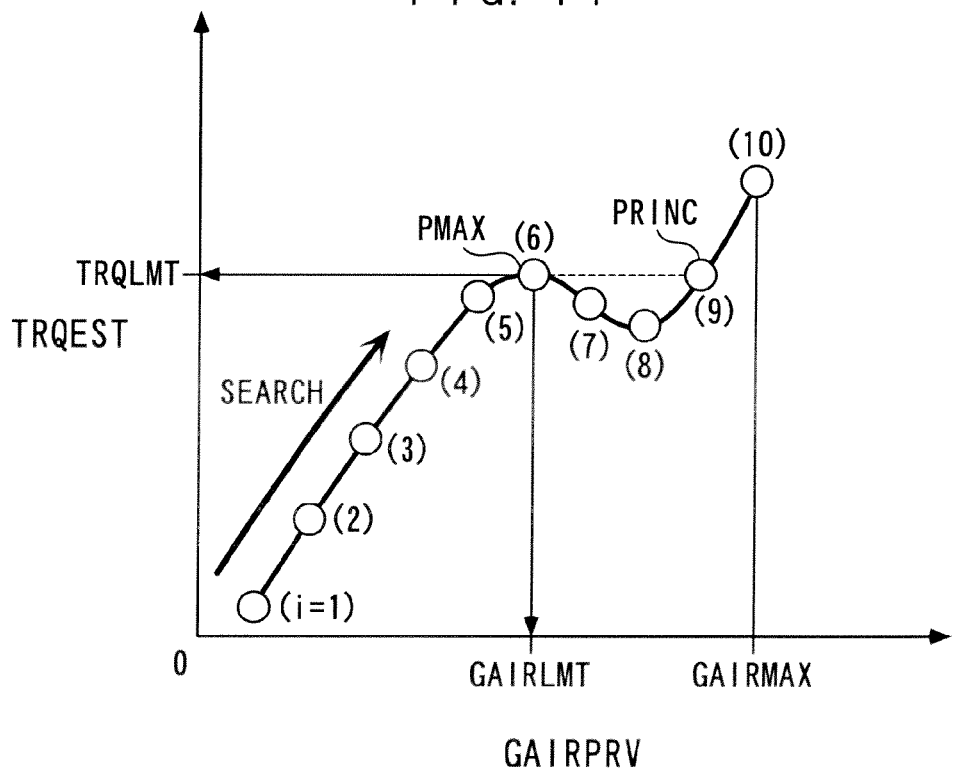
FIG. 11 is a view showing an example of an estimated torque characteristic curve having a characteristic of a fourth pattern.

Further, a fourth pattern shown in FIG. 11 is a pattern (cubic curve pattern) in which the estimated torque TRQEST decreases after passing the maximum point PMAX, similarly to the above-described second pattern, and then the estimated torque TRQEST starts to increase again due to limitation of the estimated retard amount IGRTDEST for maintaining excellent combustion and like other causes, beyond a re-increasing point PRINC equal to the maximum point PMAX.

Figure 12:
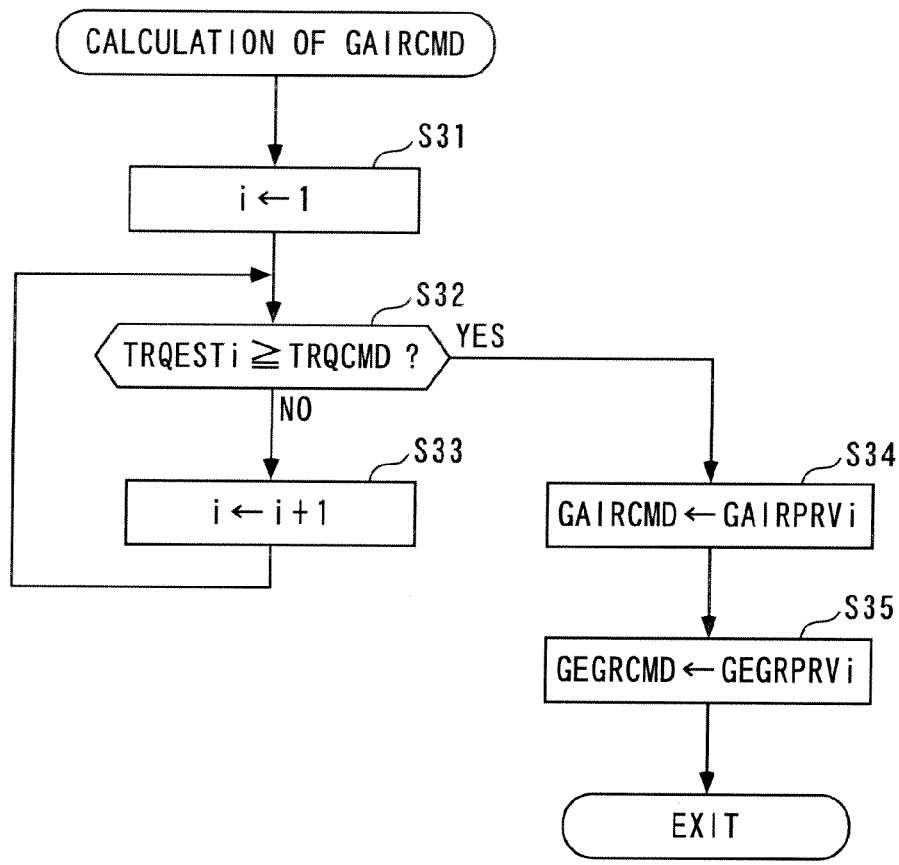
FIG. 12 is a flowchart of a subroutine of a target intake air amount-calculating process, according to a first embodiment.

Referring again to FIG. 3, in a step 7 following the step 6, the target intake air amount GAIRCMD is calculated based on the set provisional intake air amount-estimated torque relationship, followed by terminating the present process. FIG. 12 shows a subroutine of the process for calculating the target intake air amount GAIRCMD.

In the present process, first, the index number i is set to 1 (step 31), and it is determined whether or not the estimated torque TRQESTi associated with the index number i, i.e. in this case, the estimated torque TRQEST1 is not smaller than the target torque TRQCMD set in the above-described step 1 (step 32). If the answer to this question is negative (NO), the index number i is incremented (step 33), and the determination in the above-described step 32 is repeatedly executed. As described above, the determination of the estimated torque TRQESTi in the step 32 is executed in an increasing order of the index numbers i, that is, in an increasing order of the provisional intake air amounts GAIRPRVi.

On the other hand, if the answer to the question of the step 32 is affirmative (YES), i.e. if the relationship of the estimated torque TRQESTi≥the target torque TRQCMD holds, the provisional intake air amount GAIRPRVi associated with the estimated torque TRQESTi at this time is selected and set as the target intake air amount GAIRCMD (step 34). Further, the provisional EGR amount GEGRPRVi stored in a manner associated with the above provisional intake air amount GAIRPRVi is set as the target EGR amount GEGRCMD (step 35), followed by terminating the present process.

Based on the respective target intake air amount GAIRCMD and target EGR amount GEGRCMD calculated as above, the target values of the throttle valve opening θTH and the EGR valve opening LEGR are set, and further the throttle valve 10a and the EGR valve 13a are actuated based on the target values, whereby the intake air amount GAIR is controlled such that it becomes equal to the target intake air amount GAIRCMD, and the EGR amount GEGR is controlled such that it becomes equal to the target EGR amount GEGRCMD.

As described above, according to the present embodiment, the relationship between the m provisional intake air amounts GAIRPRVi corresponding respectively to 1 to m equal divisional amounts (one-mth amounts) of the maximum intake air amount GAIRMAX and the m estimated torques TRQESTi output from the engine 3 assuming that the respective provisional intake air amounts GAIRPRVi of intake air are drawn into the combustion chamber 3d is set in advance as the provisional intake air amount-estimated torque relationship. Then, based on the thus preset provisional intake air amount-estimated torque relationship, the provisional intake air amounts GAIRPRVi are sequentially searched in an increasing order thereof for a provisional intake air amount GAIRPRVi which makes the estimated torque TRQESTi equal to or larger than the target torque TRQCMD, and the provisional intake air amount GAIRPRVi found by the search is set as the target intake air amount GAIRCMD (steps 31 to 34 in FIG. 12).

Therefore, when there are a plurality of solutions to the intake air amount for attaining one target torque TRQCMD, for example, even when the characteristic patterns of the estimated torque characteristic curves are the second to fourth patterns shown in FIGS. 9 to 11, it is possible to positively select a minimum provisional intake air amount GAIRPRV, which makes the estimated torque TRQEST equal to or close to the target torque TRQCMD, without causing hunting of the provisional intake air amount GAIRPRV. Then, the selected minimum provisional intake air amount GAIRPRV is set as the target intake air amount GAIRCMD. Therefore, it is possible to improve fuel economy. Further, when such a minimum provisional intake air amount GAIRPRV is obtained, searching of the provisional intake air amounts GAIRPRVi is terminated, and no further searching process is performed, which can reduce computational load on the ECU 2.

Next, a second embodiment of the present invention will be described with reference to FIGS. 13 to 15. In the present embodiment, the same process is performed as in the above-described first embodiment until the provisional intake air amount-estimated torque relationship is set, but to calculate the target intake air amount GAIRCMD based on the relationship, a different process from that in the first embodiment is performed.

Figure 13:
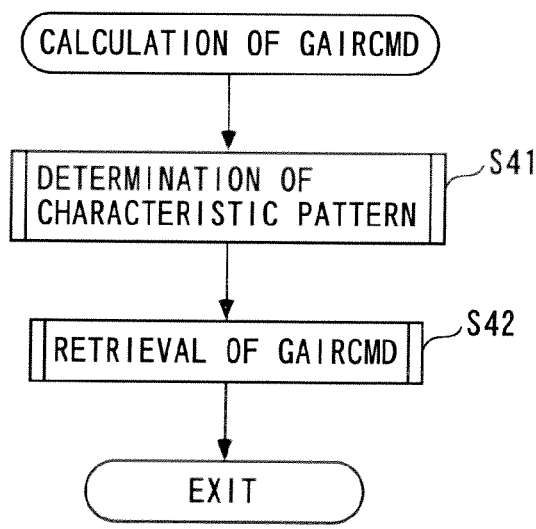
FIG. 13 is a flowchart of a main flow of a process for calculating a target intake air amount, according to a second embodiment.

FIG. 13 shows a main flow of the process for calculating the target intake air amount GAIRCMD. In the present process, it is determined to which of the above described first to fourth patterns corresponds the characteristic pattern of the estimated torque characteristic curve indicative of the provisional intake air amount-estimated torque relationship (step 41), and then based on the determined characteristic pattern, the target intake air amount GAIRCMD is searched for (step 42).

Figure 14:
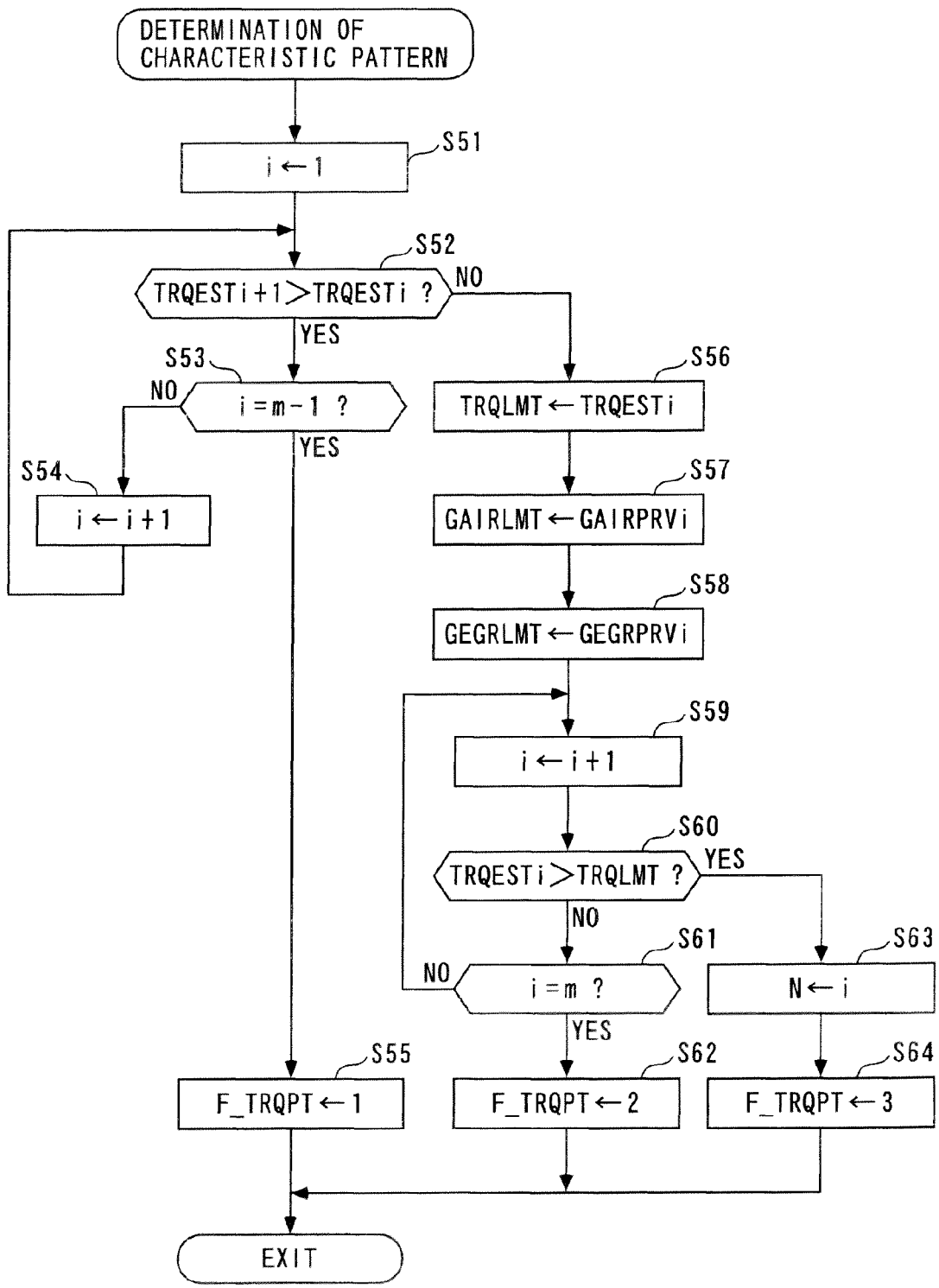
FIG. 14 is a flowchart of a subroutine of a process for determining a characteristic pattern.

FIG. 14 shows a subroutine of the process for determining a characteristic pattern, which is executed in the above-described step 41. In the present process, first, the index number i is set to 1 (step 51), and it is determined whether or not a next-order estimated torque TRQESTi+1 is larger than the estimated torques TRQESTi associated with the index number i (step 52). If the answer to this question is affirmative (YES), it is determined whether or not the index number i at this time is equal to a value (m−1) obtained by subtracting 1 from the number m of samples (step 53). If the answer to this question is negative (NO), the index number i is incremented (step 54), and then the process returns to the above-described step 52 to repeatedly perform the above-described determination.

If the answer to the question of the above-described step 53 becomes affirmative (YES) (i=m−1) with the answer to the question of the step 52 remaining affirmative (YES), i.e. if the relationship of the estimated torque TRQESTi+1>the estimated torque TRQESTi holds between any two provisional intake air amounts GAIRPRVi and GAIRPRVi+1 which are adjacent to each other, it is determined that the characteristic pattern of the estimated torque characteristic curve is the first pattern shown in FIG. 8, and to indicate the fact, a characteristic pattern flag F_TRQPT is set to 1 (step 55), followed by terminating the present process.

On the other hand, if the answer to the question of the above-described step 52 is negative (NO), i.e. if the estimated torque TRQESTi+1≤the estimated torque TRQESTi holds, it is determined that the estimated torque TRQESTi at this time corresponds to a non-increasing point at which the estimated torque TRQEST ceases to increase even when the provisional intake air amount GAIRPRV increases (the maximum point PMAX in the second pattern or the non-increasing point PNINC in the third pattern), and the estimated torque TRQESTi at this time is set as a limit torque TRQLMT (step 56). Further, the provisional intake air amount GAIRPRVi associated with the estimated torque TRQESTi is set as a limit intake air amount GAIRLMT, and the provisional EGR amounts GEGRPRVi associated with the estimated torque TRQESTi is set as a limit EGR amount GEGRLMT (steps 57 and 58).

Next, after incrementing the index number i (step 59), it is determined whether or not the estimated torque TRQESTi is larger than the limit torque TRQLMT set in the above-described step 56 (step 60). If the answer to this question is negative (NO), it is determined whether or not the index number i is equal to the number m of samples (step 61). If the answer to this question is negative (NO), the process returns to the step 59, wherein the index number i is incremented to repeatedly perform the determination in the above-described step 60.

If the answer to the question of the above-described step 61 becomes affirmative (YES) (i=m) with the answer to the question of the step 60 remaining negative (NO), i.e. if there is no estimated torque TRQEST larger than the limit torque TRQLMT within the range of the provisional intake air amount GAIRPRV larger than a value corresponding to the non-increasing point, it is determined that the characteristic pattern of the estimated torque characteristic curve is the second or third pattern shown in FIG. 9 or 10, and the characteristic pattern flag F_TRQPT is set to 2 (step 62), followed by terminating the present process.

On the other hand, if the answer to the question of the above-described step 60 is affirmative (YES), i.e. if the estimated torque TRQESTi>the limit torque TRQLMT holds, it is determined that the re-increasing point PRINC exists on the estimated torque characteristic curve, and the characteristic pattern is the fourth pattern shown in FIG. 11. Then, the index number i at this time is stored as a re-increasing point number N (step 63), and the characteristic pattern flag F_TRQPT is set to 3 (step 64), followed by terminating the present process.

Figure 15:
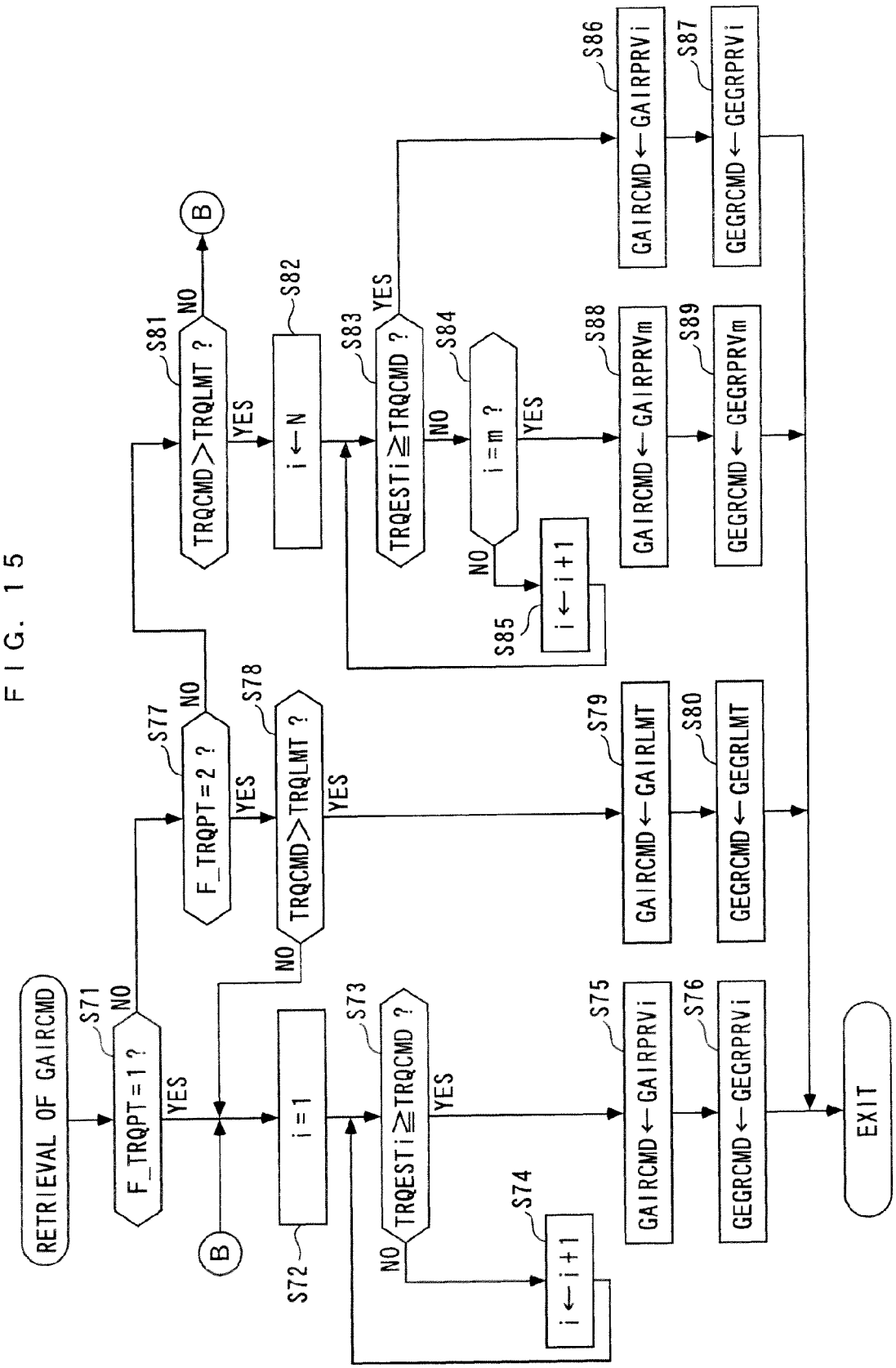
FIG. 15 is a flowchart of a subroutine of a process for retrieving a target intake air amount.

FIG. 15 is a flowchart of a subroutine of the process for retrieving a target intake air amount GAIRCMD, which is executed in the step 42 in FIG. 13. In the present process, first, in a step 71, it is determined whether or not the characteristic pattern flag F_TRQPT is equal to 1. If the answer to this question is affirmative (YES), i.e. if the determined characteristic pattern of the estimated torque characteristic curve is the first pattern, quite the same process as executed in the steps 31 to 35 in FIG. 12 according to the first embodiment is executed in steps 72 to 76 to thereby set the target intake air amount GAIRCMD and the like, followed by terminating the present process.

More specifically, after the index number i is set to 1 (step 72), it is determined whether or not the estimated torque TRQESTi is not smaller than the target torque TRQCMD (step 73). If the answer to this question is negative (NO), the index number i is incremented (step 74) to repeatedly perform the determination in the step 73. If the answer to the question of the step 73 is affirmative (YES), i.e. if the estimated torque TRQESTi≥the target torque TRQCMD holds, the provisional intake air amount GAIRPRVi at the time is set as the target intake air amount GAIRCMD (step 75), and an associated provisional EGR amount GEGRPRVi is set as the target EGR amount GEGRCMD (step 76). Thus, similarly to the first embodiment, by sequentially searching the provisional intake air amounts GAIRPRVi in an increasing order thereof, it is possible to easily and positively select a minimum provisional intake air amount GAIRPRVi and set the same as the target intake air amount GAIRCMD.

If the answer to the question of the step 71 is negative (NO), it is determined whether or not the characteristic pattern flag F_TRQPT is equal to 2 (step 77). If the answer to this question is affirmative (YES), i.e. if the characteristic pattern is the second or third pattern, it is determined whether or not the target torque TRQCMD is larger than the limit torque TRQLMT (step 78). If the answer to this question is negative (NO), i.e. if the target torque TRQCMD≤the limit torque TRQLMT holds, the process proceeds to the step 72 et seq., wherein similarly to the case of the first pattern, the provisional intake air amounts GAIRPRVi are sequentially searched in an increasing order thereof, to select one of the provisional intake air amounts GAIRPRVi when the estimated torque TRQESTi≥the target torque TRQCMD holds, and the selected provisional intake air amount GAIRPRVi is set as the target intake air amount GAIRCMD.

On the other hand, if the answer to the question of the above-described step 78 is affirmative (YES), i.e. if the target torque TRQCMD>the limit torque TRQLMT holds, the target intake air amount GAIRCMD is set to the limit intake air amount GAIRLMT set in the step 57 in FIG. 14 (step 79), and the target EGR amount GEGRCMD is set to the limit EGR amount GEGRLMT set in the step 58 (step 80), followed by terminating the present process.

As described above, in the case where the characteristic pattern is the second or third pattern, when the target torque TRQCMD, which is larger than the limit torque TRQLMT corresponding to the maximum point PMAX or the non-increasing point PNINC of the estimated torque TRQEST, is set, the target intake air amount GAIRCMD is limited to the limit intake air amount GAIRLMT associated with the limit torque TRQLMT (GAIRCMD is written in parentheses in FIGS. 9 and 10). This prevents setting of the target intake air amount GAIRCMD exceeding the maximum point PMAX or the non-increasing point PNINC, thereby making it possible to effectively avoid consumption of excessive fuel which does not contribute to an increase in the torque of the engine 3, which makes it possible to improve fuel economy.

Further, in the case where the characteristic pattern is the second pattern having the maximum point PMAX, if the intake air amount GAIR is increased beyond the maximum point PMAX, not only fuel is wastefully consumed but also the torque of the engine 3 is reduced, and hence by limiting the target intake air amount GAIRCMD using the above-described the limit intake air amount GAIRLMT, it is possible to effectively prevent reduction of the torque of the engine 3, which makes it possible to enhance drivability.

If the answer to the question of the above-described step 77 is negative (NO), i.e. if the characteristic pattern is the fourth pattern, similarly to the above-described step 78, it is determined whether or not the target torque TRQCMD is larger than the limit torque TRQLMT (step 81). If the answer to this question is negative (NO), i.e. if the target torque TRQCMD≤the limit torque TRQLMT holds, the process proceeds to the step 72 et seq., wherein similarly to the case of the first pattern, the provisional intake air amounts GAIRPRVi are sequentially searched in an increasing order thereof, to select one of the provisional intake air amounts GAIRPRVi when the estimated torque TRQESTi≥the target torque TRQCMD holds, and the selected provisional intake air amount GAIRPRVi is set as the target intake air amount GAIRCMD.

If the answer to the question of the above-described step 81 is affirmative (YES), i.e. if the target torque TRQCMD>the limit torque TRQLMT holds, the index number i is set to the re-increasing point number N stored in the step 63 in FIG. 14 (step 82), whereafter it is determined whether or not the estimated torque TRQESTi is not smaller than the target torque TRQCMD (step 83). If the answer to this question is negative (NO), it is determined whether or not the index number i is equal to the number m of samples (step 84). If the answer to this question is negative (NO), the index number i is incremented (step 85) to repeatedly perform the determination in the step 83.

If the answer to the question of the step 83 is affirmative (YES), i.e. if the estimated torque TRQESTi≥the target torque TRQCMD holds, the provisional intake air amount GAIRPRVi at the time is set as the target intake air amount GAIRCMD (step 86), and an associated one of the provisional EGR amounts GEGRPRVi is set as the target EGR amount GEGRCMD (step 87), followed by terminating the present process.

On the other hand, if the answer to the question of the above-described step 84 becomes affirmative (YES) (i=m), i.e. if there is no estimated torque TRQEST not smaller than the target torque TRQCMD within the range of the provisional intake air amount GAIRPRV larger than a value corresponding to the re-increasing point PRINC, the target intake air amount GAIRCMD is set to a provisional intake air amount GAIRPRVm corresponding to the maximum intake air amount GAIRMAX (step 88), and the target EGR amount GEGRCMD is set to the provisional EGR amount GEGRPRVm (step 89), followed by terminating the present process.

As described above, in the case where the characteristic pattern is the fourth pattern, the target torque TRQCMD exceeding the limit torque TRQLMT is set, and when there is an estimated torque TRQEST not smaller than the target torque TRQCMD within the range of the provisional intake air amount GAIRPRV larger than the value corresponding to the re-increasing point PRINC, the target intake air amount GAIRCMD is set to the provisional intake air amounts GAIRPRVi associated with the estimated torque TRQESTi at the time. This makes it possible to properly select a minimum provisional intake air amount GAIRPRVi that attains the target torque TRQCMD, and set the same as the target intake air amount GAIRCMD.

On the other hand, in the above-described case, when there is no estimated torque TRQEST not smaller than the target torque TRQCMD, the target intake air amount GAIRCMD is set to the provisional intake air amount GAIRPRVm corresponding to the maximum intake air amount GAIRMAX. This makes it possible to meet a demand from the driver of the vehicle as much as possible to cause the engine 3 to output a maximum torque.

Next, a process for setting the target throttle valve opening θTHCMD will be described with reference to FIG. 16. The present process is for finally setting the target throttle valve opening θTHCMD according to the target intake air amount GAIRCMD set in the first embodiment (FIG. 12) or the second embodiment (FIG. 15) described hereinabove.

In the present process, first, in a step 91, it is determined whether or not the detected accelerator pedal opening AP is substantially equal to a predetermined fully-open degree APWO. Then, in a step 92, it is determined whether or not the target air-fuel ratio AFCMD of a mixture burned in the engine 3 is set to a richer value than the stoichiometric air-fuel ratio. If both of the answers to these questions are affirmative (YES), the target throttle valve opening θTHCMD is set to a predetermined wide-open throttle opening θTHWO (step 93), followed by terminating the present process.

As a consequence, when the accelerator pedal opening AP is in a fully-open state, by causing the engine 3 to output the maximum torque according to a driver's demand for acceleration, it is possible to enhance drivability. In this case, under conditions where the target air-fuel ratio AFCMD is set to a richer value than the stoichiometric air-fuel ratio, the safety margin for knock is increased by a cooling effect provided by heat of evaporation of an increased amount of fuel in the combustion chamber, so that even when the target throttle valve opening θTHCMD is set to the wide-open throttle opening θTHWO, there is no fear of occurrence of conspicuous knocking.

On the other hand, if the answer to the question of the above-described step 91 or 92 is negative (NO), a provisional target throttle valve opening θTHCMDPRV, which is a provisional target value of the throttle valve opening θTH, is calculated by searching a predetermined θTHCMDPRV map (not shown) according to the target intake air amount GAIRCMD set in the process in FIG. 12 or FIG. 15 and the engine speed NE (step 94).

Then, an effective valve opening θTHEFF of the throttle valve 10a is calculated by searching a predetermined θTHEFF map (not shown) according to the engine speed NE (step 95). The effective valve opening θTHEFF represents a degree of opening of the throttle valve 10a, beyond which the torque of the engine 3 almost ceases to increase, and is defined e.g. as a valve opening corresponding to a torque lower than the torque of the engine 3 during the wide-open throttle of the throttle valve 10a by a predetermined several percent.

Next, it is determined whether or not the calculated provisional target throttle valve opening θTHCMDPRV is not larger than the effective valve opening θTHEFF (step 96). If the answer to this question is affirmative (YES), i.e. if θTHCMDPRV≤θTHEFF holds, the target throttle valve opening θTHCMD is set to the provisional target throttle valve opening θTHCMDPRV (step 97), followed by terminating the present process.

On the other hand, if the answer to the question of the step 96 is negative (NO), i.e. if θTHCMDPRV>θTHEFF holds, the target throttle valve opening θTHCMD is limited and set to the effective valve opening θTHEFF (step 98), followed by terminating the present process. This makes it possible to prevent hunting of the throttle valve opening θTH in a range beyond the effective valve opening θTHEFF, and prolong the service lives of the throttle valve 10a and the TH actuator 10b.

Note that the present invention is by no means limited to the embodiments described above, but can be practiced in various forms. For example, although in the above-described embodiments, to select the minimum provisional intake air amount GAIRPRV that attains the target torque TRQCMD, the provisional intake air amounts GAIRPRVi are sequentially searched in an increasing order thereof, this is not limitative, but the whole provisional intake air amount-estimated torque relationship may be searched first to select therefrom a minimum provisional intake air amount GAIRPRVi satisfying the conditions.

Further, although in the above-described embodiments, as the result of search of the provisional intake air amounts GAIRPRVi, one of the provisional intake air amounts GAIRPRVi, obtained when the estimated torque TRQEST≥the target torque TRQCMD holds, is directly set as the target intake air amount GAIRCMD, this is not limitative, but when the target torque TRQCMD is not equal to any estimated torque TRQESTi but is positioned between two of the estimated torques TRQESTi, the provisional intake air amount GAIRPRV may be calculated by interpolation of the two estimated torques TRQESTi. Further, although in the above-described embodiments, the effective valve opening θTHEFF of the throttle valve 10a is set according to the engine speed NE, this is not limitative, but it may be replaced by a predetermined fixed value.

Furthermore, the number m of samples (m=10) of the provisional intake air amount GAIRPRVi shown in the above-described embodiments is given only by way of example, and it is to be understood that the number m of samples may be increased or decreased. When the number m of samples is increased, the minimum provisional intake air amount GAIRPRVi that attains the target torque TRQCMD can be selected in a more fine-grained manner, thereby making it possible to enhance the calculation accuracy of the minimum provisional intake air amount GAIRPRVi.

Further, the methods of calculating the maximum intake air amount GAIRMAX, the estimated retard amount IGRTDEST, the estimated torque TRQEST, and so forth shown in the above-described embodiments are given only by way of example, and it is to be understood that any other suitable methods may be employed.

Furthermore, although in the above-described embodiments, the present invention is applied to the automotive gasoline engine, this is not limitative, but it can be applied to various engines other than the gasoline engine, e.g. a diesel engine, and further, it can be applied to engines other than the engines for vehicles, e.g. engines for ship propulsion machines, such as an outboard motor having a vertically-disposed crankshaft. Further, it is possible to change details of the construction of the embodiment within the spirit and scope of the present invention.

It is further understood by those skilled in the art that the foregoing are preferred embodiments of the invention, and that various changes and modifications may be made without departing from the spirit and scope thereof.

What is claimed is:

1. An intake control system for an internal combustion engine, for setting a target intake air amount according to a target torque of the engine and controlling an intake air amount based on the set target intake air amount, comprising:

maximum intake air amount-calculating means for calculating, based on operating conditions of the engine, a maximum amount of intake air that can be drawn into a combustion chamber, as a maximum intake air amount;

provisional intake air amount-setting means for setting a plurality of provisional intake air amounts different from each other within a range of the intake air amount, which ranges from 0 to the calculated maximum intake air amount;

estimated torque-calculating means for calculating, based on the operating conditions of the engine, estimated torques that are estimated to be output from the engine assuming that the set plurality of provisional intake air amounts of intake air are drawn into the combustion chamber, respectively, as a plurality of estimated torques;

provisional intake air amount-estimated torque relationship-setting means for setting a provisional intake air amount-estimated torque relationship, which is a relationship between the plurality of provisional intake air amounts and the plurality of calculated estimated torques; and target intake air amount-setting means for setting a minimum provisional intake air amount that makes the estimated torque equal to or close to the target torque, as the target intake air amount, by selecting the minimum provisional intake air amount from the set provisional intake air amount-estimated torque relationship.

2. The intake control system as claimed in claim 1, wherein said target intake air amount-setting means sequentially searches the plurality of provisional intake air amounts in an increasing order of the provisional intake air amounts based on the provisional intake air amount-estimated torque relationship, for the provisional intake air amount that makes the estimated torque equal to or close to the target torque, and terminates the search of the provisional intake air amounts when the provisional intake air amount that makes the estimated torque equal to or close to the target torque is found, while setting the found provisional intake air amount as the target intake air amount.

3. The intake control system as claimed in claim 1, further comprising:

provisional target throttle valve opening-calculating means for calculating a provisional target throttle valve opening, which is a provisional target of an opening degree of a throttle valve for adjusting the intake air amount, according to the target intake air amount; and target throttle valve opening-setting means for setting a target throttle valve opening, which is a final target value of the opening degree of the throttle valve, to the provisional target throttle valve opening when the calculated provisional target throttle valve opening is equal to or smaller than an effective valve opening, which is an opening degree of the throttle valve beyond which torque of the engine almost ceases to increase, and setting the target throttle valve opening, when the provisional target throttle valve opening is larger than the effective valve opening, by limiting the target throttle valve opening to the effective valve opening.

4. The intake control system as claimed in claim 2, further comprising:

provisional target throttle valve opening-calculating means for calculating a provisional target throttle valve opening, which is a provisional target of an opening degree of a throttle valve for adjusting the intake air amount, according to the target intake air amount; and target throttle valve opening-setting means for setting a target throttle valve opening, which is a final target value of the opening degree of the throttle valve, to the provisional target throttle valve opening when the calculated provisional target throttle valve opening is equal to or smaller than an effective valve opening, which is an opening degree of the throttle valve beyond which torque of the engine almost ceases to increase, and setting the target throttle valve opening, when the provisional target throttle valve opening is larger than the effective valve opening, by limiting the target throttle valve opening to the effective valve opening.

\* \* \* \* \*